Patented June 24, 1941

2,246,545

UNITED STATES PATENT OFFICE 2,246,545

ISOPRENE PROPIONATE AND METHOD FOR MAKING THE SAME

Frank J. Soday, Upper Darby, Pa., assignor to The United Gas Improvement Company, a corporation of Pennsylvania No Drawing. Application November 23, 1938, Serial No. 242,001

11 Claims. (Cl. 260—488)

The present invention relates to a new composition of matter and to a method for its preparation.

More particularly, this invention pertains to isoprene propionate and to a method for the preparation of this isoprene derivative.

By the term "isoprene propionate" throughout the specification and claims is meant the propionic acid ester of "isoprene alcohol," which alcohol may alternatively be designated as dimethylvinyl carbinol (see Whitmore, Organic Chemistry, (1937) page 56), or as 2-methyl-2-hydroxy butene-3.

This invention is based upon the discovery that isoprene propionate, having the general formula

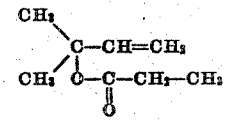

may be prepared in excellent yields through the reaction of propionic acid or its salts upon isoprene alcohol, isoprene alcohol derivatives, such as the metal derivatives, or hydrohalogen derivatives of isoprene. High yields are obtained despite the fact that tertiary alcohols as a rule either do not react at all or react with very low yields.

It is an object of the present invention to provide a new composition of matter, namely, isoprene propionate, and a process for the preparation thereof. Another object of this invention is to provide a new compound having utility in a number of chemical and related industries. More specifically, it is an object of this invention to provide an isoprene derivative which may be used as a solvent for paints, lacquers, varnishes, enamels or similar coating compositions. Another specific object of this invention is to provide a compound which may be used as an ingredient in perfumes and various pharmaceutical preparations. Still another specific object of this invention is to provide a compound which may be used as an intermediate in chemical synthesis. Other objects and advantages of the invention will be apparent to those skilled in the art from the following descriptions.

Isoprene, having the general formula

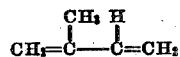

is the basic component in the preparation of the new composition of matter, isoprene propionate. It may be obtained from various sources, such as synthetically from the pyrogenic decomposition of rubber, or from fractions obtained upon the fractionation of condensates obtained in the manufacture of carburetted water gas, oil gas, refinery gas, or coke oven gas, or from similar sources. Such fractions will be referred to herein, generally, as light oil isoprene fractions. Such fractions obtained in the manufacture of oil gas are particularly preferred.

Hydrocarbon fractions containing from 5 to 100% of isoprene may be successfully used in the production of the herein described isoprene derivatives, although in general the use of fractions containing from 50 to 100% isoprene is preferred for the production of products of high quality.

In general, the initial step in the preparation of isoprene propionate is the conversion of isoprene into a monohydrohalogen derivative.

The preparation of the hydrogen halide derivative may be effected in a number of ways.

For instance, liquid or gaseous hydrogen halide may be introduced into isoprene, or into an isoprene fraction, say by means of a porous tube, or a pipe containing a porous cap, or otherwise.

On the other hand, liquid or gaseous hydrogen halide may be contacted with liquid or gaseous isoprene or isoprene fraction in a kettle, or in an open or packed tower, or otherwise.

The reactants may be contacted in any desired manner, for instance, concurrently, or countercurrently, or in a static system.

I prefer to employ hydrogen chloride as the hydrogen halide. However, other hydrogen halides such as hydrogen bromide or hydrogen iodide, may be employed without departing from the spirit of the invention.

When a hydrogen halide, for example, hydrogen chloride, is added to isoprene, it is thought that the following reaction takes place:

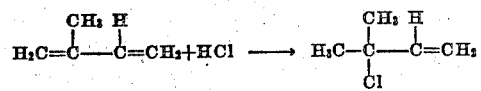

Isoprene    hydrogen chloride    tertiary isoprene monohydrochloride

The unstable tertiary chloride thus formed, namely, 2-methyl 2-chlorobutene-3, presumably changes, at least in part, on standing to a primary chloride, namely, 2-methyl 4-chlorobutene-2, having the following formula:

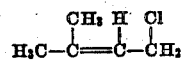

Primary isoprene monohydrochloride

Isoprene monohydrohalides may be prepared in the following manner.

*Example 1*

An isoprene fraction containing 70% by weight of isoprene was obtained by the fractionation of condensate obtained in the manufacture of oil gas.

This fraction also contained some olefines boiling in the same range and possibly some piperylene and cyclopentadiene. Isoprene fractions of lower concentration may contain considerable quantities of these materials.

A quantity equivalent to approximately 3,000 parts by weight of this fraction was cooled to approximately 0° C., whereupon a stream of dry hydrogen chloride was introduced into the isoprene fraction over a period of 50 hours, the temperature being maintained at approximately 0° C. throughout the entire time.

The mixture was then allowed to stand overnight and was then distilled.

That portion of the distillate boiling within the range of 90 to 110° C. at 760 mm. pressure was collected as isoprene monohydrochloride.

That portion of the distillate boiling below 90° C. and comprising for the most part unchanged isoprene, was retreated and distilled in the same manner. The distillate collected between 90 and 110° C. was combined with the first distillate.

There was thus obtained a quantity of isoprene monohydrochloride equivalent to approximately 3,000 parts by weight. This fraction of isoprene monohydrochloride had the following physical properties:

Density ($d$ 20°/4°) =0.9069
Refractive index ($n$ 20°/$d$) =1.43225

A quantity equivalent to approximately 1,100 parts by weight of hydrogen chloride was absorbed. This corresponds with the theoretical quantity required to add hydrogen chloride to one of the double bonds of the isoprene contained in the given quantity of starting material.

The preparation of isoprene monohydrohalide in the above manner may be carried out at any suitable temperature.

Temperatures between −60 and 36° C. may be employed for the production of isoprene monohydrohalide in the liquid phase, isoprene boiling at the upper temperature limit indicated.

On the other hand, if desired, the reaction may be carried out in the vapor phase by employing temperatures above 36° C. although there are limiting factors such as the tendency of isoprene to form isoprene dihydrohalide, which may or may not be desired, or to polymerize at elevated temperatures in the presence of an acid catalyst.

In general, it is preferred to carry out the reaction in the liquid phase, while employing temperatures between −60° and 10° C.

If desired, halogenating catalysts may be employed to accelerate the addition of hydrogen halide to the isoprene molecule. Examples of halogenating catalysts are methyl alcohol and acetone.

The isoprene monohydrohalide thus obtained, namely the distillate boiling between 90° C. and 110° C. or, if desired, the crude reaction product prior to distillation, or any fraction thereof, whether narrower or wider than the above fraction, may be employed in the preparation of isoprene propionate, although a fairly pure material is generally preferred.

Isoprene propionate may be prepared (1) by converting the isoprene monohydrohalide into isoprene alcohol which is then reacted with propionic acid or its anhydride, or its acid halide, or (2) reacting a metal derivative of isoprene alcohol, such as the sodium derivative (i. e., the alcoholate) with propionic acid or its anhydride, or its acid halide, or (3) reacting isoprene monohydrohalide directly such as with a metal propionate of which potassium propionate is an example.

The conversion of isoprene monohydrohalide into isoprene alcohol may be effected in any desired manner, for example, the isoprene monohydrohalide may be hydrolyzed with aqueous alkaline solutions such as sodium hydroxide, potassium hydroxide, sodium carbonate, sodium bicarbonate, calcium hydroxide, and similar reagents. In general, the use of mild alkalis such as sodium carbonate at moderate temperatures such as, for example, between 30 and 100° C. and at moderate pressures such as, for example, between 1 to 2 atmospheres is preferred.

If desired, hydrolysis may be effected in the presence of a suitable solvent, such as for example toluene.

Upon hydrolysis of the halide, it is believed that a molecular rearrangement takes place as follows:

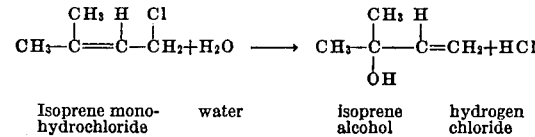

| Isoprene mono-hydrochloride | water | Isoprene alcohol | hydrogen chloride |

The isoprene alcohol obtained in this manner may be refined by fractionation or otherwise, or if desired, the alcohol may be directly employed in the preparation of esters without refining.

Isoprene alcohol may be reacted with propionic acid or its anhydride, or the acid halide by combining the reactants, preferably by the application of heat. A suitable method is to heat the reactants in a closed container provided with a reflux condenser until the reaction is substantially complete.

I prefer to dissolve the reactants in a solvent such as benzene, particularly when employing the refluxing method.

Since the reaction forms water, there is produced a ternary mixture consisting of isoprene alcohol, benzene and water. The water formed may be removed during the esterification reaction if desired. This may be accomplished, for instance, by permitting the reflux condensate to collect and stratify in a separate receptacle, whereupon the water layer is continuously removed and the remainder of the condensate is returned to the reaction zone.

On the other hand, the water may be removed, after the reaction has become completed, among other ways, by separating the liquid layers, whereupon the solvent and unreacted alcohol may be removed from the reaction product by distillation or otherwise.

Unreacted propionic acid present in the reaction product may be neutralized by an alkali or alkaline solution, if desired, such as sodium bicarbonate, preferably before the removal of solvent and unreacted alcohol. On the other hand, the unreacted propionic acid may be separated from the other constituents by distillation.

The preparation of isoprene alcohol, and its reaction with propionic acid is illustrated in the following example.

Example 2

A quantity of isoprene monohydrochloride equivalent to 2,000 parts by weight was stirred for four hours at room temperature with 17,000 parts by weight of a 15% sodium carbonate solution. Carbon dioxide was steadily evolved during the reaction. The isoprene monohydrochloride, which is present as an oily layer, gradually disappears.

The reaction product was extracted with ether, and the ether removed by distillation. The extracted material thus obtained was fractionated to isolate isoprene alcohol.

There was thus obtained approximately 400 parts by weight of isoprene alcohol having the following physical properties:

Boiling range 95–100° C. at —760 mm.
Density $(d\ 20°/4°) = 0.8255$
Refractive index $(n\ 20°/d) = 1.41446$ Approximately 325 parts by weight of the isoprene alcohol thus prepared was added to a mixture containing 185 parts by weight of propionic acid and 225 parts by weight of benzene. This mixture was refluxed for a period of approximately seven hours after which the water of reaction was removed and the solution neutralized with sodium bicarbonate.

The benzene and excess alcohol were removed from the reaction product by distillation and the residue was fractionated at a pressure of 8 mm. of mercury, absolute, to obtain a water-white liquid possessing an exceptionally pleasant fruity odor.

The quantity secured was approximately 160 parts by weight.

This particular isoprene propionate fraction was found to have the following physical properties:

Boiling range 48–51° C. at 8 mm. absolute
Density $(d\ 20°/4°) = 0.8596$
Refractive index $(n\ 20°/d) = 1.43448$ If desired, esterification catalysts, such as sulfuric acid, phosphoric acid, anhydrous hydrogen chloride, and the like, may be employed.

As pointed out above isoprene propionate may also be prepared by reacting a metal salt of propionic acid with isoprene monohydrohalide. Refluxing the materials over a period of several hours has been found to be particularly effective. Furthermore, the presence of propionic acid facilitates the reaction.

After the reaction is complete, residual propionic acid, if any, may be neutralized, if desired, after which the ester formed may be recovered in any suitable manner, for instance, by extraction and the ester may be separated in any suitable manner such as by distillation, whereupon the ester may be further fractionated, if desired.

The reaction between a metal salt of propionic acid and isoprene monohydrohalide is illustrated in the following example.

Example 3

A mixture of 200 parts by weight of isoprene hydrochloride, 250 parts by weight of potassium propionate, and 200 parts by weight of anhydrous propionic acid were refluxed for a period of approximately three hours. The reaction mixture was then cooled, poured into an equal volume of water, and neutralized with an alkaline solution such as sodium bicarbonate.

The isoprene propionate thus formed was extracted with diethyl ether; the ether removed by distillation, and the residue fractionated.

There was thus obtained approximately 120 parts by weight of an isoprene propionate fraction having the following physical properties:

Boiling range 48–51° C. at 8 mm. absolute
Density $(d\ 20°/4°) = 0.9035$
Refractive index $(n\ 20°/d) = 1.43245$ Other metal derivatives of propionic acid, such as the sodium, calcium, iron, lead, or other metal salts, may be substituted for potassium propionate. The reaction may be carried out in the presence or absence of free propionic acid or anhydride and in the presence or absence of a solvent such as benzene. The reaction may be carried out at any suitable temperature, such as the boiling point of the mixture, and may be carried out at any suitable pressure, such as atmospheric, subatmospheric, or superatmospheric pressures.

The properties of isoprene propionate make it an excellent solvent for paints, lacquers, varnishes, enamels, and similar coating compositions. It is also particularly valuable as an intermediate in chemical synthesis. Its unsaturated nature makes it a convenient compound for introducing constituents, thereby making possible the production of a wide variety of derivatives of isoprene and isoprene propionate. The exceptionally pleasant odor of this material recommends it for many uses to which materials of this character are put, such as in perfumes, soaps, pharmaceutical preparations, et cetera.

While the invention has been described more particularly in connection with propionic acid, in its broadest phases it also includes substituted propionic acid.

Therefore, in the claims, the term "propionic compound" embraces propionic acid, substituted propionic acid, their salts, anhydrides, and acid halides. Also in the claims, the term "propionic acid" includes the anhydride or mixtures of the two. The term "hydrogen halide" embraces hydrogen chloride, bromide, iodide and fluoride. The term "isoprene hydrohalide" embraces the isoprene derivatives of these four hydrogen halides. The term "isoprene" includes pure isoprene, technical or commercial grades thereof when produced, isoprene solutions, and hydrocarbon fractions containing any quantity of isoprene regardless of source. The term "isoprene derivative" is intended to embrace the hydroxyl derivative of isoprene, the metal derivatives of said hydroxyl derivative (i. e., the alcoholate), and the monohydrohalides of isoprene. The term "metal propionate" includes potassium, sodium, calcium, iron, lead, and other such salts of propionic acid. Additionally, the term "esterification catalyst" includes such compounds as sulfuric acid, phosphoric acid, anhydrous hydrogen chloride, and the like.

While reagents and procedures of a particular nature have been specifically described, it is to be understood that these are by way of illustration. Therefore, changes, omissions, additions, substitutions and/or modifications might be made within the scope of the claims without departing from the spirit of the invention.

I claim:

1. A propionic ester of 2-methyl-2-hydroxy-butene-3 having the formula:

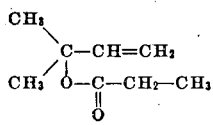

2. The process of preparing a propionic ester of 2-methyl-2-hydroxy-butene-3 which comprises fractionating a condensate obtained in the manufacture of gas wherein petroleum oil is pyrolytically decomposed to obtain a fraction relatively rich in isoprene, treating said isoprene with a hydrogen halide to yield a methyl halobutene and reacting said methyl halobutene with a metal propionate.

3. The process of preparing a propionic ester of 2-methyl-2-hydroxy-butene-3 which comprises treating an isoprene-containing fraction which has been obtained in the manufacture of gas wherein petroleum oil is pyrolytically decomposed with a hydrogen halide thereby obtaining a methyl halobutene, hydrolyzing the methyl halobutene to yield a methyl hydroxybutene, and reacting the thus produced alcohol without complete separation thereof with propionic acid.

4. The process of preparing a propionic ester of 2-methyl-2-hydroxy-butene-3 which comprises treating an isoprene-containing fraction which has been obtained in the manufacture of gas wherein petroleum oil is pyrolytically decomposed with a hydrogen halide thereby obtaining a methyl halobutene, hydrolyzing the methyl halobutene to yield a methyl hydroxybutene, and reacting the thus-produced alcohol without complete separation thereof with propionyl halide.

5. A process for preparing a propionic ester of 2-methyl-2-hydroxy-butene-3 which comprises reacting an isoprene derivative derived from light oil with a compound yielding a propionic acid radical including the following compounds: (a) methyl halobutene, (b) methyl hydroxybutene, (c) methyl metaloxybutene, (A) metal propionate, (B) propionic acid, (B') propionic anhydride, and (C) propionyl halide, wherein the reactant pair is selected from the reacting pair groups consisting of aA; bB; bB'; bC; cB; cB', and cC.

6. The process of preparing propionic ester of 2-methyl-2-hydroxy-butene-3 which comprises contacting a light oil isoprene fraction with a hydrogen halide to form a methyl halobutene, and reacting said methyl halobutene with a metal propionate.

7. In the process of claim 5, the step of effecting esterification in the presence of an esterification catalyst.

8. In the process of claim 6, the step of effecting esterification in the presence of a solvent.

9. In the process of claim 5, the step of continuously removing water during the esterification reaction.

10. In the process of claim 6, the step of contacting the isoprene fraction with a halogen halide in the presence of a halogenating catalyst.

11. In the process of claim 6, the step of effecting esterification in the presence of propionic acid.

FRANK J. SODAY.